US008638645B1

(12) United States Patent
Nishijima et al.

(10) Patent No.: US 8,638,645 B1
(45) Date of Patent: Jan. 28, 2014

(54) THERMALLY ASSISTED MAGNETIC HEAD SLIDER HAVING PLASMON UNIT FORMED WITH A RECESS

(71) Applicant: SAE Magnetics (H.K.) Ltd., Hong Kong (CN)

(72) Inventors: Natsuo Nishijima, Hong Kong (CN); Ryuji Fujii, Hong Kong (CN); Hong Tao Ma, DongGuan (CN); Jian Hui Huang, DongGuan (CN); Huan Chao Liang, DongGuan (CN); Zhong Xian Wei, DongGuan (CN)

(73) Assignee: SAE Magnetics (H.K.) Ltd., Hong Kong (CN)

( * ) Notice: Subject to any disclaimer, the term of this patent is extended or adjusted under 35 U.S.C. 154(b) by 0 days.

(21) Appl. No.: 13/675,581

(22) Filed: Nov. 13, 2012

(51) Int. Cl.
*G11B 11/00* (2006.01)
(52) U.S. Cl.
USPC .................................... 369/13.33; 369/13.13
(58) Field of Classification Search
USPC .......... 369/13.33, 13.13, 13.32, 13.02, 13.17, 369/112.09, 112.14, 112.21, 112.27, 300; 360/59; 385/129, 31, 88–94; 29/603.07–603.27; 250/201.3, 201.5
See application file for complete search history.

(56) References Cited

U.S. PATENT DOCUMENTS

| 8,059,496 | B1 * | 11/2011 | Zhou et al. | 369/13.33 |
| 2010/0103553 | A1 | 4/2010 | Shimazawa et al. | |
| 2011/0170381 | A1 * | 7/2011 | Matsumoto | 369/13.33 |
| 2012/0008229 | A1 * | 1/2012 | Zhou et al. | 369/13.33 |
| 2012/0113771 | A1 * | 5/2012 | Matsumoto | 369/13.33 |

* cited by examiner

*Primary Examiner* — Tan X Dinh
(74) *Attorney, Agent, or Firm* — Nixon & Vanderhye PC

(57) ABSTRACT

A write element for a thermally assisted magnetic head slider includes an air bearing surface facing to a magnetic recording medium; a first magnetic pole, a second magnetic pole, and coils sandwiched between the first and the second magnetic poles; a waveguide for guiding light generated by a light source module mounted on a substrate; and a plasmon unit provided around the first magnetic pole and the waveguide, which has a near-field light generating surface for propagating near-field light to the air bearing surface. The near-field light generating surface of the plasmon unit is apart from the air bearing surface with a first predetermined distance to form a first recess, and the first recess is filled in with a protective layer. The thermally assisted magnetic head slider can prevent the plasmon unit from protruding over the air bearing surface, thereby improving the performance of thermally assisted magnetic head.

17 Claims, 14 Drawing Sheets

THERMALLY ASSISTED MAGNETIC HEAD SLIDER HAVING PLASMON UNIT FORMED WITH A RECESS

FIELD OF THE INVENTION

The present invention relates to a hard disk drive (HDD) and, more particularly, to a write element, a thermally assisted magnetic recording head, a head gimbal assembly (HGA), an HDD with the same, and manufacturing methods thereof.

BACKGROUND OF THE INVENTION

Hard disk drives are common information storage devices. FIG. 1a provides an illustration of a typical disk drive unit 100 essentially consisting of a series of rotatable disks 101 mounted on a spindle motor 102, and a Head Stack Assembly (HSA) 130 which is rotatable about an actuator arm axis 105 for accessing data tracks on disks during seeking. The HSA 130 includes at least one drive arm 104 and a head gimbal assembly (HGA) 150. Typically, a spindling voice-coil motor (VCM) is provided for controlling the motion of the drive arm 104.

Referring to FIG. 1b, the HGA 150 includes a slider having a thermally assisted head 110, and a suspension 190 to load or suspend the slider 103 thereon. The suspension 190 includes a load beam 106, a base plate 108, a hinge 107 and a flexure 109, all of which are assembled together. When the disk drive is on, a spindle motor 102 will rotate the disk 101 at a high speed, and the slider 103 will fly above the disk 101 due to the air pressure drawn by the rotated disk 101. The slider 103 moves across the surface of the disk 101 in the radius direction under the control of the VCM. With a different track, the slider 103 can read data from or write data to the disk 101.

Referring to FIG. 1c, the slider 103 includes a substrate 1031 having an air bearing surface (ABS) 1032 processed so as to provide an appropriate flying height and the thermally assisted head 110 for reading and writing. The thermally assisted magnetic head 110 includes a write element (not labeled) and a read element (not labeled). This thermally assisted head 110 applies a thermal energy source 111, such as a laser diode at or near the location of the write element. Conventionally, the thermal energy source 111 is bonded to the substrate 1031 by using a solder, for example. This thermal energy source 111 provides energy to a portion of the magnetic recording medium, which reduces the medium's coercivity. After that, writing is performed by applying write magnetic field to the heated portion; therefore the writing operation is facilitated. Generally proposed is a method in which the magnetic recording medium is irradiated and heated with near-field light. The spot of the near-field light is set to be minute; the very small spot size can be realized which is free of diffraction limit. Meanwhile, a waveguide is provided for propagating the laser light to the ABS 1032 by a surface of a plasmon generator (PG), thereby providing near-field light, instead of directly applying the laser light to an element that generate near-field light. Commonly, the PG is made of materials having high light absorption and low light refraction index. Such a plasmon generator and a waveguide are disclosed, for example, in US Patent Publication No. 2010/0103553 A1 and U.S. Pat. No. 8,059,496 B1.

U.S. Pat. No. 8,059,496 B1 discloses a write element having a main pole 11, a PG layer 12, and a waveguide 17, as shown in FIG. 1d. The PG layer 12 is recessed from the ABS 10-10. There is a magnetic layer 11e that is effectively an extension of the main pole 11 formed between the PG layer 12 and the ABS 10-10, and the magnetic layer 11e is comprised of the same material as in the main pole 11. Namely the magnetic layer 11e is a part of the main pole 11. When a laser is emitted to the write element, the laser is guided to the PG layer 12 by the waveguide 17. As known, the main pole 11 and the magnetic layer 11e also have high light absorption characteristic and low light refraction index, thus the near-field light may be reached to the top surface of the magnetic layer 11e to form the near-field light generating surface 121, finally propagated to the ABS 10-10. By this token, the near-field light generating surface 121 and the ABS 10-10 are in the same level as shown in FIG. 1d.

However, the near-field light generating end of the PG layer 12 and the magnetic layer 11e both of which have high light absorption characteristic and low light refraction index will protrude over the ABS 10-10 as shown in FIG. 1f since high temperature is generated during the writing operation, which may crash the magnetic recording medium surface.

Accordingly, it is desired to provide improved write element, a thermally assisted magnetic head slider, HGA, HDD with the same, and a manufacturing method thereof to overcome the above-mentioned drawbacks.

SUMMARY OF THE INVENTION

One objective of the present invention is to provide a write element for a thermally assisted magnetic head slider, which can prevent a plasmon unit from protruding over the ABS, thereby improving the performance of thermally assisted magnetic head slider.

Another objective of the present invention is to provide a thermally assisted magnetic head slider, which can prevent a plasmon unit from protruding over the ABS, thereby improving the performance of thermally assisted magnetic head slider.

Still another objective of the present invention is to provide an HGA having a thermally assisted magnetic head slider, which can prevent a plasmon unit from protruding over the ABS, thereby improving the performance of thermally assisted magnetic head slider.

Yet another objective of the present invention is to provide an HDD having a thermally assisted magnetic head slider, which can prevent a plasmon unit from protruding over the ABS, thereby improving the performance of thermally assisted magnetic head slider.

Yet another objective of the present invention is to provide a manufacturing method of a thermally assisted magnetic head slider, by which a plasmon unit is prevented from protruding over the ABS, thereby the performance of thermally assisted magnetic head slider is improved.

To achieve above objectives, a write element for a thermally assisted magnetic head slider of the present invention, includes an ABS facing to a magnetic recording medium; a first magnetic pole, a second magnetic pole, and coils sandwiched between the first magnetic pole and the second magnetic pole; a waveguide for guiding light generated by a light source module mounted on a substrate of the thermally assisted magnetic head slider; and a plasmon unit provided around the first magnetic pole and the waveguide, which has a near-field light generating surface for propagating near-field light to the ABS. The near-field light generating surface of the plasmon unit is apart from the ABS with a first predetermined distance to form a first recess, and the first recess is filled in with a protective layer.

As an embodiment of the present invention, opposed-to-medium surfaces of the first, second magnetic poles and the waveguide are apart from the air bearing surface with a second predetermined distance to form a second recess, and the second recess is filled in with the protective layer.

Preferably, the second predetermined distance is smaller than the first predetermined distance.

Alternatively, the first predetermined distance is smaller than the second predetermined distance.

More preferably, the first predetermined distance is in a range of 1 nm~300 nm.

As another embodiment of the present invention, the opposed-to-medium surfaces of the first, second magnetic poles and the waveguide are covered by the protective layer.

As yet an embodiment of the present invention, the write element further includes a seed layer formed on the near-field generating surface and the opposed-to-medium surfaces of the first and second magnetic poles, and the protective layer is formed on the seed layer.

Preferably, the protective layer includes low light absorption material.

More preferably, the low light absorption material is one or more selected from TaOx, SiOx, AlOx, WOx, BCxNy, AlNx, SiNx, AlOxNy, SiOxNy, TiOx, ZrOx, and MgOx.

More preferably, the seed layer is made by one or more selected from Si, Al, Mg, Ta, W, Ti, MgOx, SiNx, AlNx, AlOx, SiNxOy, AlNxOy, WOx, and diamond-like carbon (DLC).

Preferably, the protective layer is recessed from a top of the air bearing surface with a third predetermined distance at a position that is opposed to the near-field light generating surface.

Alternatively, a surface of the protective layer is flat.

As still an embodiment of the present invention, a carbon coat layer is covered on the protective layer.

Preferably, the carbon coat layer is recessed from a top of the air bearing surface with a fourth predetermined distance at a position that is opposed to the near-field light generating surface.

Preferably, the plasmon unit is a plasmon antenna or a plasmon generator.

A thermally assisted magnetic head slider of the present invention includes a substrate having an ABS facing to a magnetic recording medium, a read element, and a write element. And the write element includes a first magnetic pole, a second magnetic pole, and coils sandwiched between the first magnetic pole and the second magnetic pole; a waveguide for guiding light generated by a light source module mounted on the substrate; and a plasmon unit provide around the first magnetic pole and the waveguide, which has a near-field light generating surface for propagating near-field light to the ABS. The near-field light generating surface of the plasmon unit is apart from the ABS with a first predetermined distance to form a first recess, and the first recess is filled in with a protective layer.

An HGA of the present invention includes a thermally assisted magnetic head slider having a substrate with an ABS facing to a magnetic recording medium, a read element and a write element, and a suspension supporting the thermally assisted magnetic head slider. And the write element includes a first magnetic pole, a second magnetic pole, and coils sandwiched between the first magnetic pole and the second magnetic pole; a waveguide for guiding light generated by a light source module mounted on the substrate; and a plasmon unit provided around the first magnetic pole and the waveguide, which has a near-field light generating surface for propagating near-field light to the ABS. The near-field light generating surface of the plasmon unit is apart from the ABS with a first predetermined distance to form a first recess, and the first recess is filled in with a protective layer.

An HDD of the present invention includes an HGA with a thermally assisted magnetic head slider, a drive arm to connect with the HGA, a rotatable disk, and a spindle motor to spin the disk. The thermally assisted magnetic head slider includes a substrate having an ABS facing to a magnetic recording medium, a read element and a write element. And the write element includes a first magnetic pole, a second magnetic pole, and coils sandwiched between the first magnetic pole and the second magnetic pole; a waveguide for guiding light generated by a light source module mounted on the substrate; and a plasmon unit provided around the first magnetic pole and the waveguide, which has a near-field light generating surface for propagating near-field light to the ABS. The near-field light generating surface of the plasmon unit is apart from the ABS with a first predetermined distance to form a first recess, and the first recess is filled in with a protective layer.

Accordingly, a manufacturing method of a thermally assisted magnetic head slider of the present invention includes steps of:

(a) providing a wafer with a plurality of thermally assisted magnetic head slider elements each of which has a substrate with an ABS, a read element and a write element including a first magnetic pole, a second magnetic pole, coils, a waveguide, and a plasmon unit;

(b) cutting the wafer into a plurality of row bars;

(c) lapping surfaces of the row bars so as to obtain a predetermined requirement;

(d) etching a first recess on a near-field light generating surface of the plasmon unit, thereby the plasmon unit is apart from the ABS with a first predetermined distance;

(e) depositing a protective layer on the near-field light generating surface of the plasmon unit; and (f) cutting the row bar into a plurality of individual thermally assisted magnetic head slider.

As another embodiment of the present invention, the method further includes etching a second recess on opposed-to-medium surfaces of the first, second magnetic poles and the waveguide, thereby the first, second magnetic poles and the waveguide are apart from the air bearing surface with a second predetermined distance.

Preferably, the method further includes depositing a seed layer on the near-field light generating surface of the plasmon unit and beneath the protective layer.

Preferably, the method further includes etching a third recess with a third predetermined distance on the protective layer at a position that is opposed to the near-field light generating surface.

Preferably, the method further includes depositing a diamond-like carbon layer on opposed-to-medium surfaces of the read element and the write element after the step (c) and before the step (d).

Preferably, the method further includes coating a carbon coat layer to cover the diamond-like carbon layer and the protective layer.

Preferably, the method further includes removing a portion of the carbon coat layer at a position that is opposed to the near-field light generating surface.

More preferably, the method further included heating the portion of the carbon coat layer at a position that is opposed to the near-field light generating surface, thereby removing the portion of the carbon coat layer.

As yet an embodiment, the method further includes etching a fourth recess with a fourth predetermined distance on the carbon coat layer at a position that is opposed to the near-field light generating surface.

Preferably, the method further includes lapping the ABS to form a flat surface after the step (e) and before the step (f).

Preferably, etching way in the step (d) is ion beam selective etching.

Alternatively, etching way in the step (d) includes photo masking.

In comparison with the prior art, since the near-field light generating surface of the plasmon unit is apart from the ABS with a first predetermined distance to form a first recess, and the first recess is filled in with a protective layer, thus the plasmon unit will be prevented from over-expanding and protruding over the ABS during a thermally assisted writing operation. Meanwhile, as a protective layer is deposited on the near-field light generating surface of the plasmon unit, thus the plasmon unit can be protected so as not to crash the magnetic recording medium surface when it expands.

Other aspects, features, and advantages of this invention will become apparent from the following detailed description when taken in conjunction with the accompanying drawings, which are a part of this disclosure and which illustrate, by way of example, principles of this invention.

BRIEF DESCRIPTION OF THE DRAWINGS

The accompanying drawings facilitate an understanding of the various embodiments of this invention. In such drawings.

DETAILED DESCRIPTION OF ILLUSTRATED EMBODIMENTS

Figure 1A:
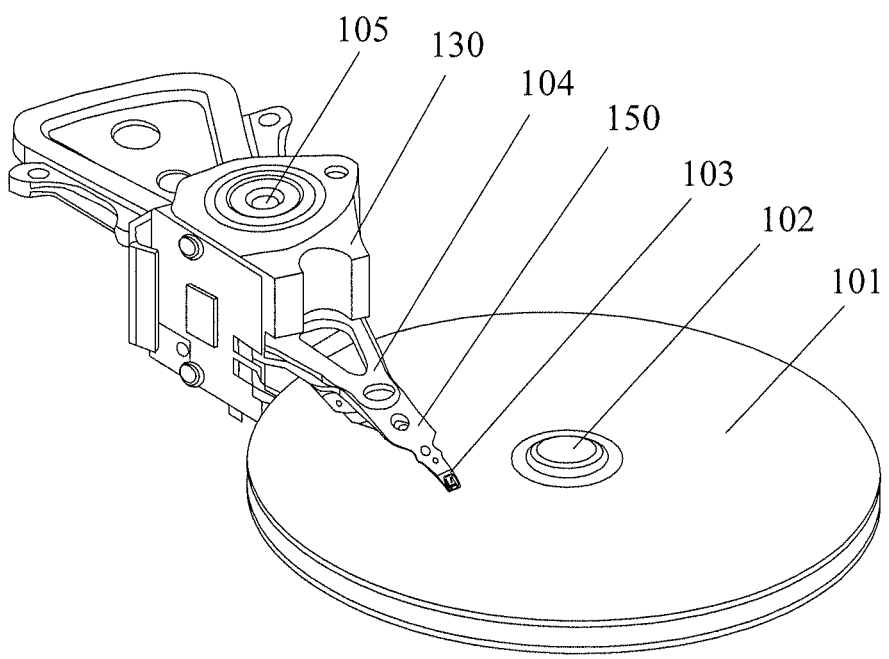
FIG. 1a is a partial perspective view of a conventional HDD.
Figure 1B:
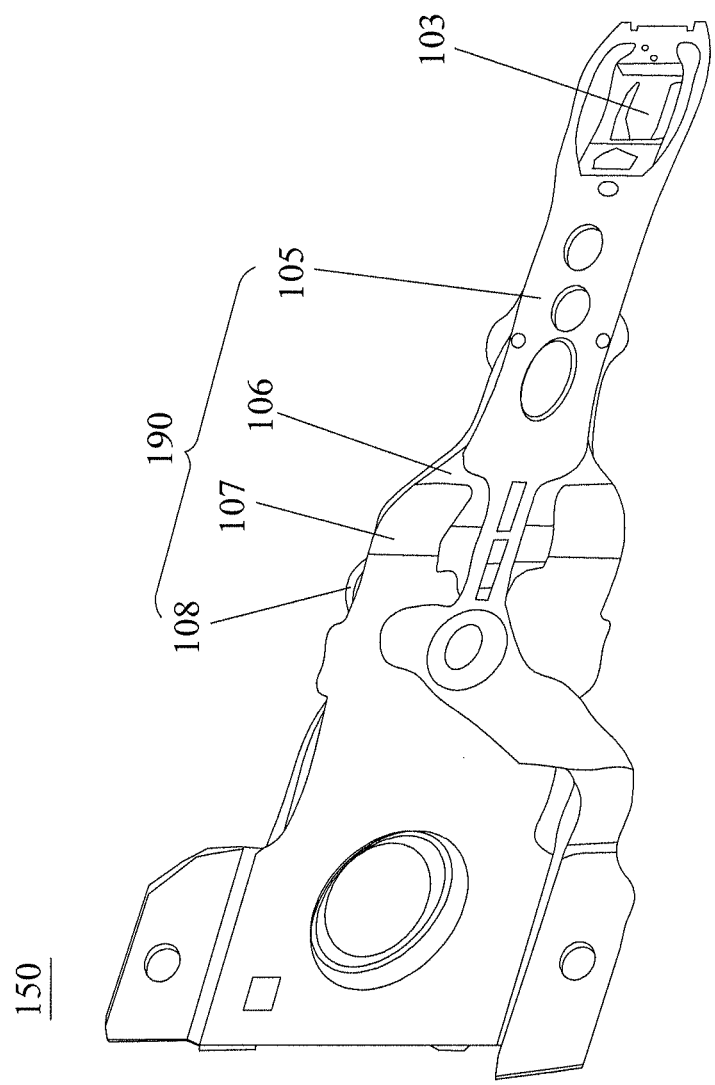
FIG. 1b is a partial top plan view of a conventional HGA.
Figure 1C:
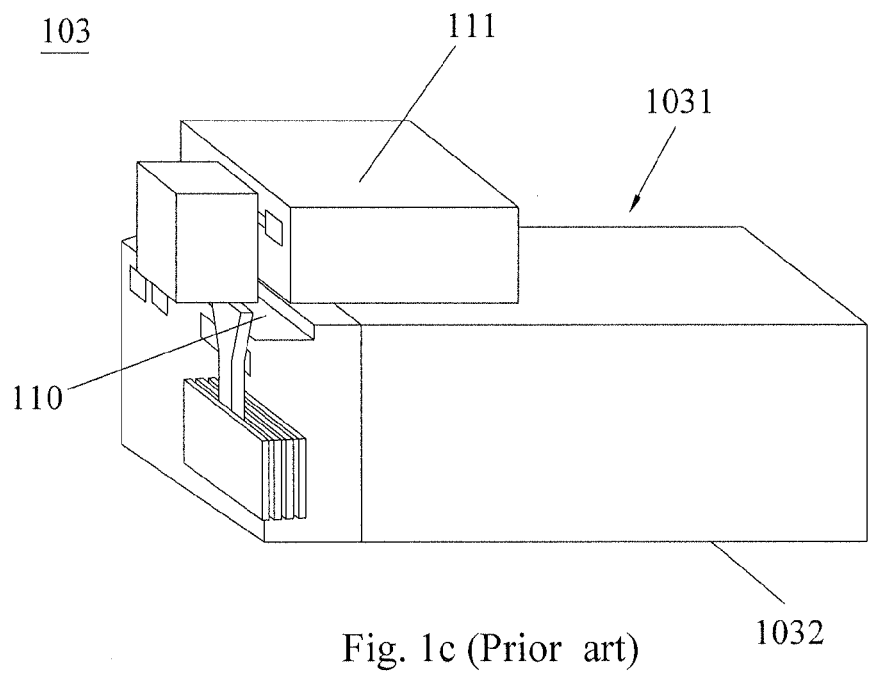
FIG. 1c is a perspective view of a conventional slider having a conventional thermally assisted magnetic head.
Figure 1D:
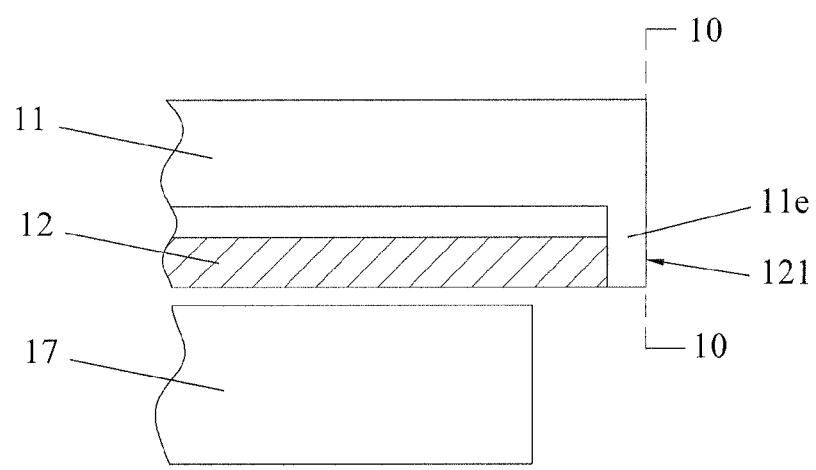
FIG. 1d is a cross-sectional view of a conventional write element of a thermally assisted magnetic head.
Figure 1E:
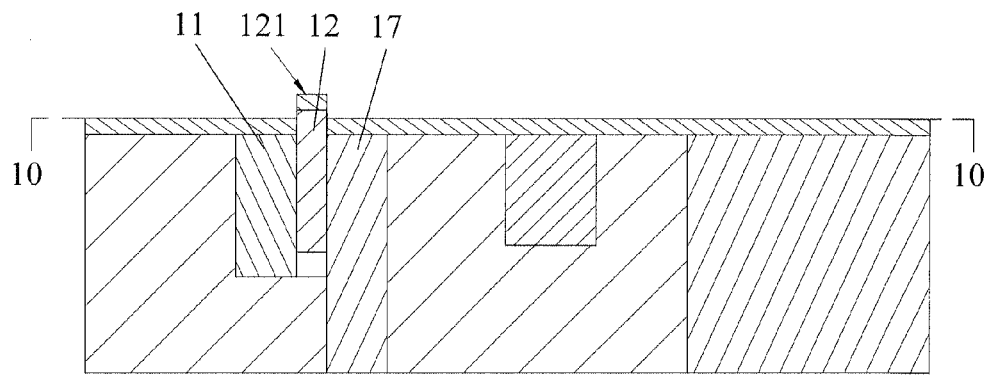
FIG. 1e is a schematic view of the thermally assisted head slider showing the write element protruding over the ABS under high temperature.

Various preferred embodiments of the invention will now be described with reference to the figures, wherein like reference numerals designate similar parts throughout the various views. As indicated above, the invention is directed to a write element, thermally assisted magnetic head slider, HGA, HDD with the same, and directed to manufacturing method thereof, thereby improving the performance of the thermally assisted magnetic head slider and enhancing the structure of the HDD finally.

Figure 2:
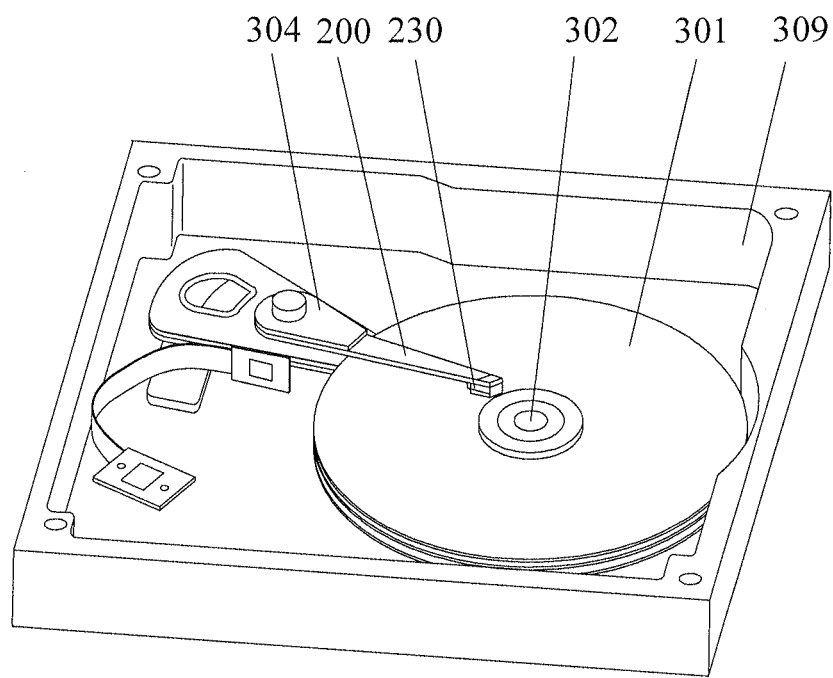
FIG. 2 is a perspective view of an HDD according to an embodiment of the invention.
Figure 3:
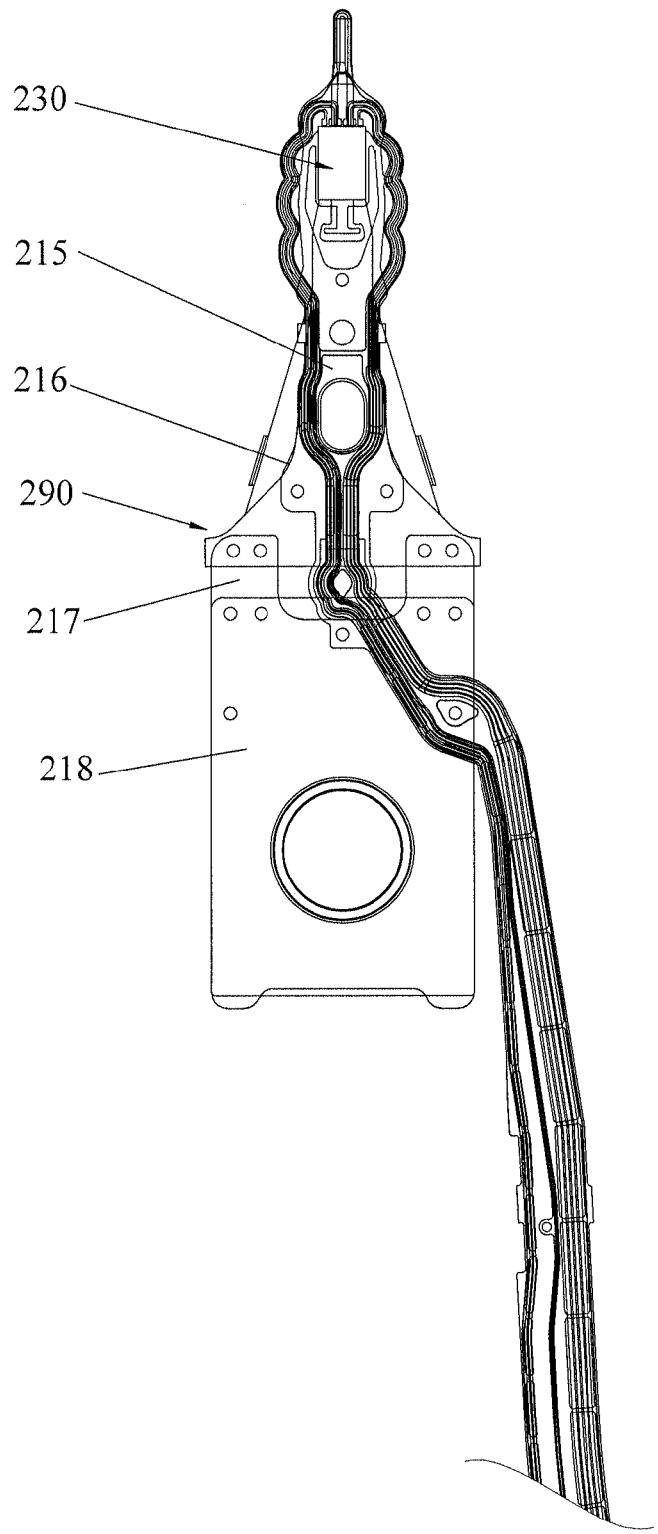
FIG. 3 is a perspective view of the HGA of the hard disk drive shown in FIG. 2.

FIG. 2 is a perspective view of an HDD according to an embodiment of the present invention. The HDD 300 includes several HGAs 200, drive arms 304 stacked and connected to the HGAs 200, a series of rotatable disks 301, and a spindle motor 302 to spin the disk 301, all of which are mounted in a housing 309. The structure of the HDD 300 according to the present invention is not limited to that described above. For example, the number of the rotatable disks 301, HGAs 200 and drive arms 304 may be one. As shown in FIG. 3, each HGA 200 includes a suspension 290 and a thermally assisted magnetic head slider 230 carried on the suspension 290 for reading from and writing into the rotatable disks 301. The suspension 290 includes a load beam 216, a base plate 218, a hinge 217 and the flexure 215, all of which are assembled with each other. Specifically, the thermally assisted head slider 230 is carried on the flexure 215.

Figure 4:
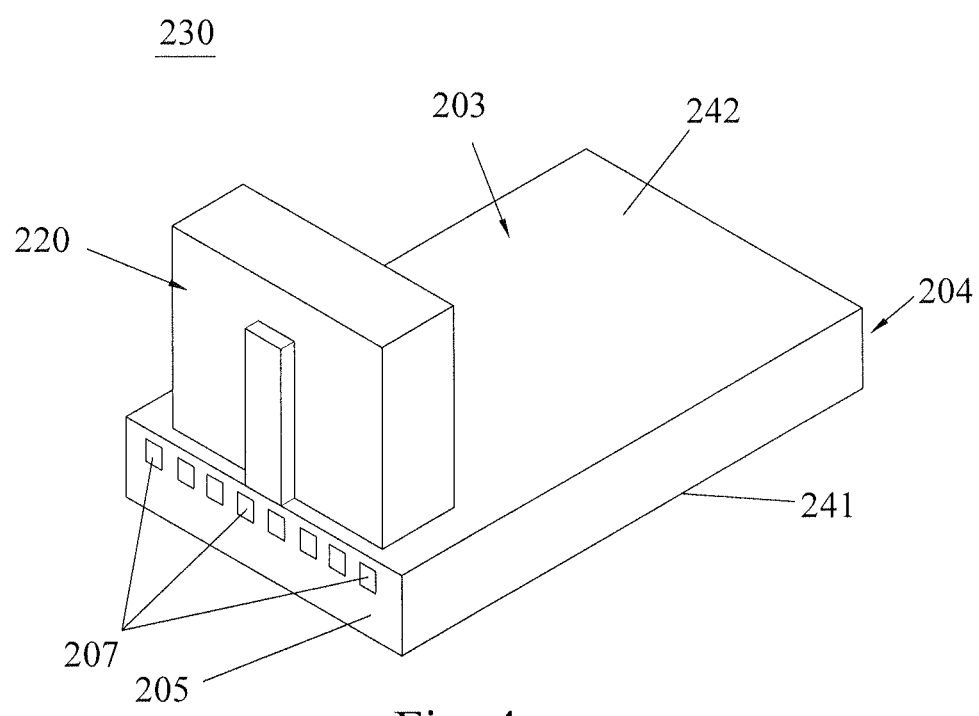
FIG. 4 is a perspective view of a thermally assisted magnetic head slider according to an embodiment of the present invention.
Figure 5:
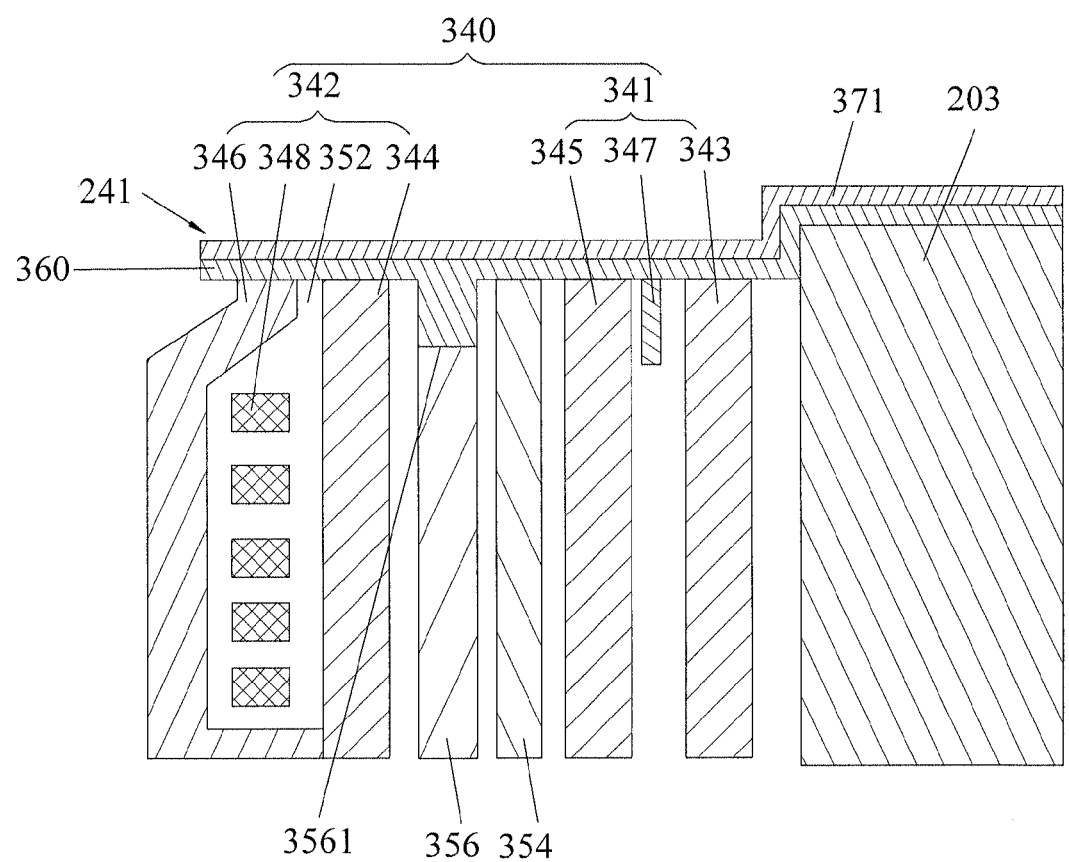
FIG. 5 is a cross-sectional view of the thermally assisted magnetic head slider shown in FIG. 4.

As shown in FIGS. 4-5, the thermally assisted magnetic head slider 230 includes a substrate 203, a thermally assisted magnetic head 340 embedded in the substrate 203 for reading and writing, and a light source module 220 formed on the substrate 203 for thermally assisted magnetic recording. In this embodiment, the light source module 220 is a laser diode, but not limited to that.

Concretely, referring to FIG. 4 again, the substrate 203 includes a leading edge 204, a trailing edge 205, an ABS 241 facing to the disk and processed so as to provide an appropriate flying height, an opposing surface 242 opposite the ABS 241, and a read/write element embedded in the trailing edge 205. The trailing edge 205 has multiple bonding pads 207, such as eight, to couple with a suspension 209 of the HGA 200. Specifically, the light source module 220 is mounted on the opposing surface 242.

FIG. 5 is a partial cross-section view of the thermally assisted magnetic head 340. Concretely, thermally assisted magnetic head 340 includes a magnetoresistive (MR) read element 341 formed on the substrate 203 and a write element 342 formed on the MR read element 341. For example, the MR read element 341 can be Current Perpendicular to Plane (CPP) sensor, Current In Plane (CIP) sensor, tunnel magnetoresistive (TMR) sensor, giant magnetoresistive (GMR) sensor, or anisotropic magnetoresistive (AMR) sensor and the like.

In this embodiment, the MR read element 341 includes a first shielding layer 343 formed on the substrate 203, a second shielding layer 345, and a MR element 347 sandwiched between the first and second shielding layers 343, 345. And a pair of hard magnet layers (not shown) is sandwiched therebetween as well and respectively placed on two sides of the MR element 347. And the MR read element 341 further includes a non-magnetic insulating layer (not shown) formed at one side of the MR element 347 far from the ABS 241.

Figure 6:
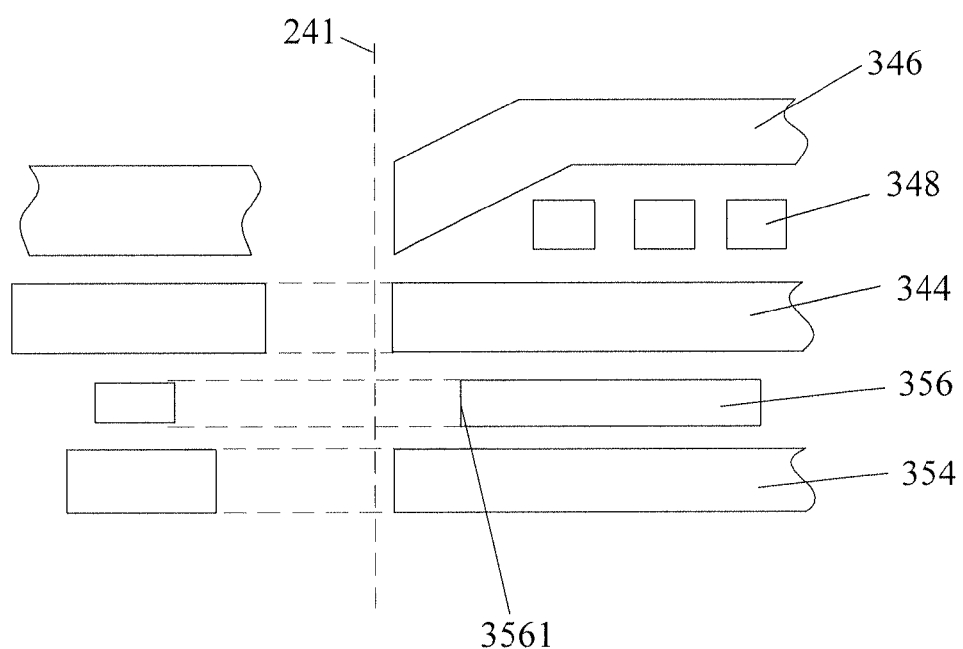
FIG. 6 is a simplified cross-sectional view of a write element of the thermally assisted magnetic head slider according to an embodiment of the present invention.

Referring to FIGS. 5-6, the write element 342 includes a first magnetic pole 344, a second magnetic pole 346, coils 348 and a first gap layer 352 sandwiched between the first and second magnetic poles 344, 346, a waveguide 354 formed adjacent to the first magnetic pole 344 for guiding light generated by the light source module 220, and a plasmon unit 356 sandwiched between the first magnetic pole 344 and the waveguide 354 for propagating near-field light to the ABS 241. Commonly, the first magnetic pole 344 is a main pole, and the second magnetic pole 346 is a return pole. The plasmon unit 356 can be a plasmon generator or a plasmon antenna. Concretely, the plasmon unit 356 includes a near-field light generating surface 3561 facing to the ABS 241. The plasmon unit 356 is made of nonmagnetic materials including Au, Ag, Cu, Al, Ti, Ta or Ge element or alloy thereof such as, which has high light absorption characteristic and low light refraction index, and its thickness is in a range of 10 nm~1000 nm.

During reading and writing operations, the thermally assisted magnetic head 340 aerodynamically flies above the surface of the rotating disks 301 with a predetermined flying height. Thus, the ends of the MR read element 341 and the write element 342 face the surface of the magnetic recording layer (not shown) of the magnetic disk 301 with an appropriate magnetic spacing. Then the MR read element 341 reads data by sensing signal magnetic field from the magnetic recording layer, and the write element 342 writes data by applying signal magnetic field to the magnetic recording layer. When writing data, signal current is conducted through the coils 348 and flux is induced into the first and second magnetic poles 344, 346, which causes flux to fringe across the pole tips at the ABS 241. This flux magnetizes circular tracks on the rotating disk 301 during a write operation. Meanwhile, laser light is generated from the light source module 220, for example the laser diode, and propagated through the waveguide 354 and guided to the plasmon unit 356. Then, the near-field generating surface 3561 of the plasmon unit 356 will generate near-field light which may be propagated to the ABS 241. The generated near-field light reaches the surface of the magnetic disk 301, and heat a portion of the magnetic recording layer of the magnetic disk 301. As a result, the coercive force of the portion is decreased to a value that facilitates writing; thus the thermally assisted magnetic recording can be accomplished successfully.

Figure 7A:
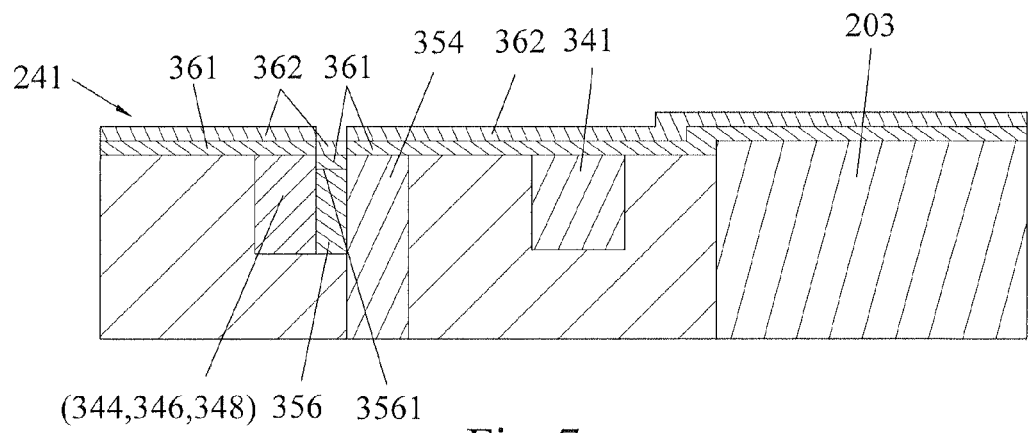
FIG. 7a is a simplified view of the thermally assisted magnetic head slider according to a first embodiment of the present invention.

Within the contemplation of the present invention, as shown in FIG. 7a, the near-field light generating surface 3561 of the plasmon unit 356 is apart from the ABS 241 with a first predetermined distance (not labeled) to form a first recess (not labeled), and the first recess is filled in with a protective layer 362 having low light absorption materials, thereby preventing the near-field light generating surface 3561 of the plasmon unit 356 from protruding over the ABS 241 to crash the magnetic recording medium during the thermally assisted writing operation. Preferably, for enhancing the protective layer 362, a seed layer 361 is formed on the near-field light generating surface 3561 and the opposed-to-medium surfaces of the first and second magnetic poles 344, 346, and the protective layer 362 is formed on the seed layer 361. Preferably, the seed layer 361 and the protective layer 362 are extended to cover opposed-to-medium surfaces of the substrate 203, the read element 341 and the whole write element 342.

Figure 7B:
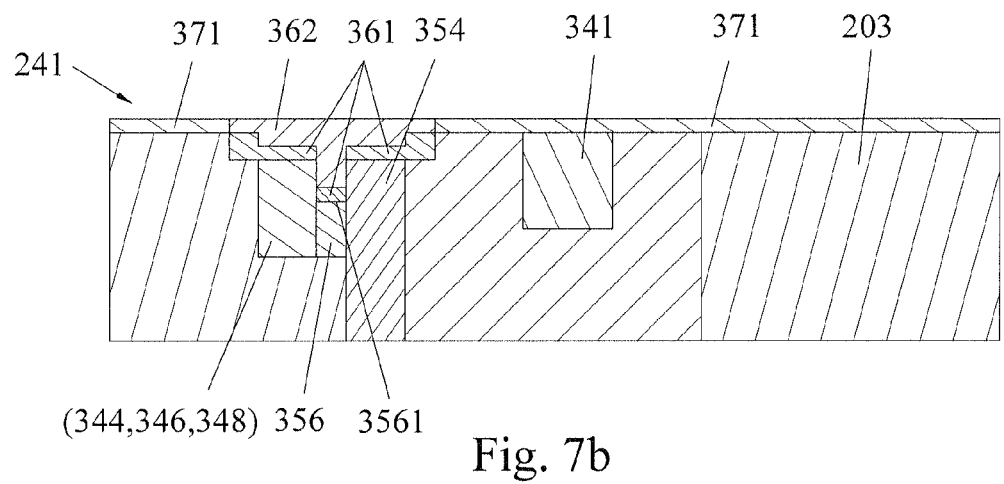
FIG. 7b is a simplified view of the thermally assisted magnetic head slider according to a second embodiment of the present invention.

As shown in FIG. 7b, as a preferred embodiment, opposed-to-medium surfaces of the first, second magnetic poles 344, 346 (here the elements 344, 346, 348 are represented as a rectangle) and the waveguide 354 are apart from the ABS 241 with a second predetermined distance to form a second recess (not labeled), and the second recess is filled in with the protective layer 362. Concretely, the first recess and the second recess are communicated. Preferably, the first predetermined distance is in a range of 1 nm~300 nm. In this embodiment, the second predetermined distance is smaller than the first predetermined distance. Alternatively, the first predetermined distance can be designed smaller than the second predetermined. Since the plasmon unit 356, the first, second magnetic poles 344, 346 and the waveguide 354 are recessed under the ABS 241, and the protective layer 362 having low light absorption material is covered on the near-field light generating surface 3561 of the plasmon unit 356 and the opposed-to-medium surfaces of the first, second magnetic poles 344, 346 and the waveguide 354, thus the plasmon unit 356 is prevented from being protruded over the ABS 241 and crashed on the magnetic disk 301 in a condition of high temperature.

Preferably, as mentioned, the protective layer 362 is made by low light absorption material, for example the protective layer 362 is made by TaOx, SiOx, AlOx, WOx, BCxNy, AlNx, SiNx, AlOxNy, SiOxNy, TiOx, ZrOx, MgOx, so that less heat energy will be absorbed. And the seed layer 361 beneath the protective layer 362 is made by Si, Al, Mg, Ta, W, Ti, MgOx, SiNx, AlNx, AlOx, SiNxOy, AlNxOy, WOx, DLC (Diamond-like carbon), which is not easy to be bended so as to enhance the protective layer 362 and reduce the thermal deformation of the protective layer 362.

Meanwhile, the protective layer 362 in this embodiment has a flat surface which is served as the ABS 241 namely. Based on this design, the flying height of the thermally assisted magnetic head slider 230 can be easy to control, and the thermally assisted magnetic head slider 230 will not be touched the magnetic recording medium surface as the ABS 241 is not rough.

As shown in FIG. 7b, the protective layer 362 and the seed layer 361 are covered on the opposed-to-medium surfaces of the first, second magnetic poles 344, 346, coils 348, plasmon unit 356, and waveguide 354, and a carbon coat layer 371 is covered on opposed-to-medium surfaces of the read element 341, the substrate 203, and other parts of the write element 342. Alternatively, the carbon coat layer 371 is a DLC layer or BCxNy layer, not limited.

Figure 7C:
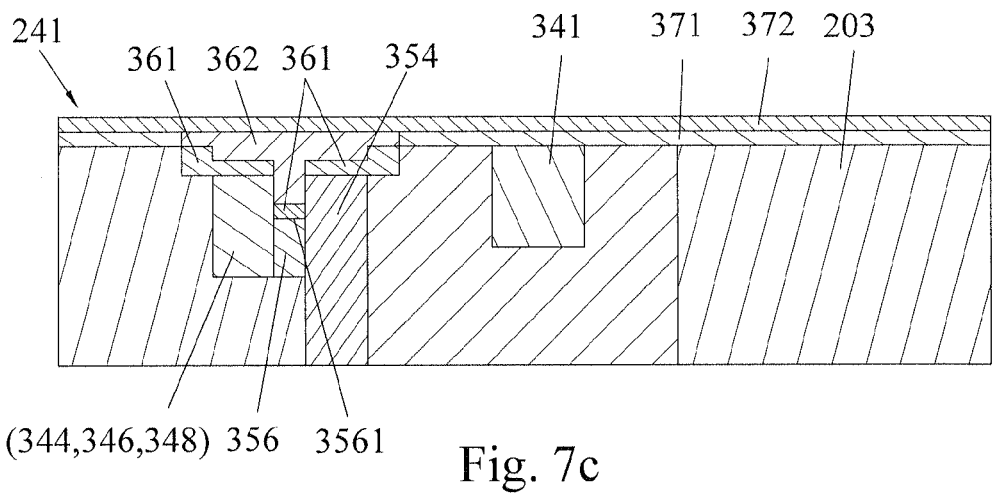
FIG. 7c is a simplified view of the thermally assisted magnetic head slider according to a third embodiment of the present invention.

Preferably, one more carbon coat layer 372 is covered on the surfaces of the protective layer 362 and the carbon coat layer 371 as shown in FIG. 7c, so as to protect the surfaces thereof. Concretely, the final surface processed is flat, which is easy to control the flying height of the thermally assisted magnetic head slider 230 and the thermally assisted magnetic head slider 230 can be prevented from being touched as the surface is rough.

Figure 7D:
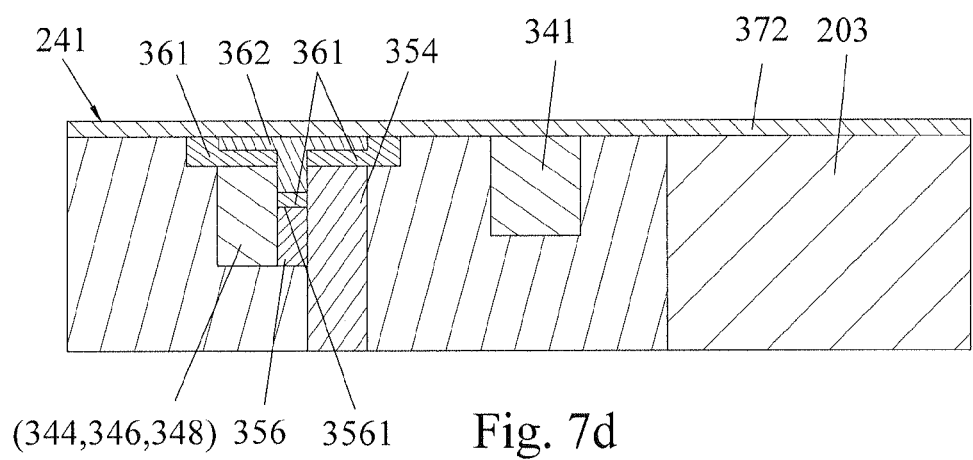
FIG. 7d is a simplified view of the thermally assisted magnetic head slider according to a fourth embodiment of the present invention.

FIG. 7d shows a fourth embodiment of the thermally assisted magnetic head slider 230, differing from the third embodiment, the carbon coat layer 371 is omitted, and the carbon coat layer 372 is covered on opposed-to-medium surfaces of the write element 342, read element 341 and the substrate 203 directly.

Figure 7E:
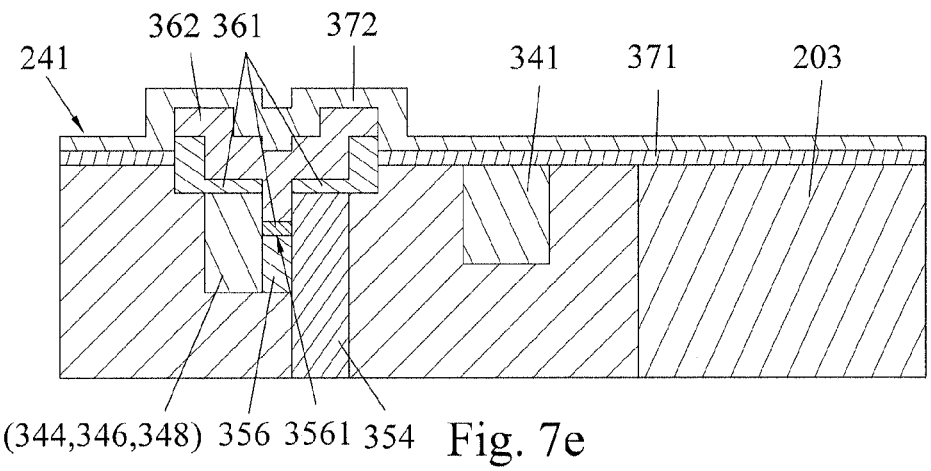
FIG. 7e is a simplified view of the thermally assisted magnetic head slider according to a fifth embodiment of the present invention.

FIG. 7e presents a fifth modified embodiment of the thermally assisted magnetic head slider 230. Different from the embodiments above, the thickness of the protective layer 362 in this embodiment is thicker so that a portion of the protective layer 362 is protruded over other surfaces, so that the thermal stability of the protective layer 362 can be increased during the thermally assisted recording, thereby preventing from crashing the magnetic recording medium.

Figure 7F:
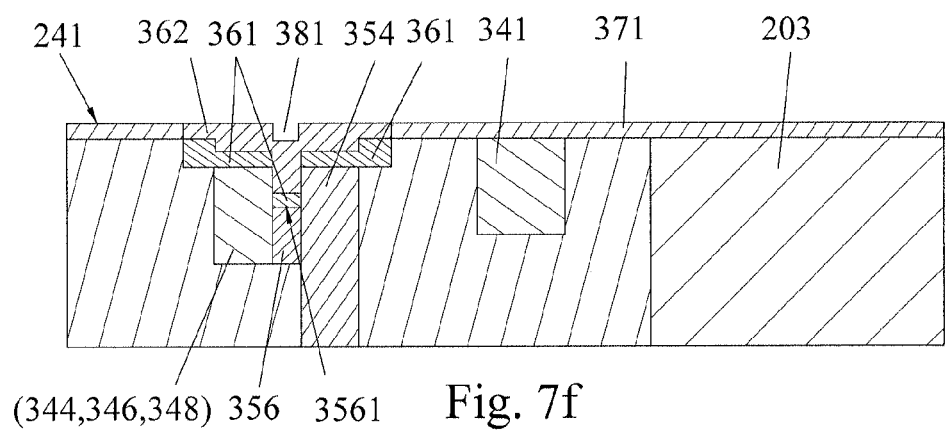
FIG. 7f is a simplified view of the thermally assisted magnetic head slider according to a sixth embodiment of the present invention.

FIG. 7f shows a sixth embodiment of the thermally assisted magnetic head slider 230 according to the present invention. Concretely, the protective layer 362 is recessed from a top the ABS 241 with a third predetermined distance at a position that is opposed to the near-field light generating surface 3561 of the plasmon unit 356, that is, a third recess 381 is formed on the protective layer 362. This configuration provides an extension range to the plasmon unit 356 during writing operation, which can prevent the near-field light generating surface 3561 of the plasmon unit 356 from protruding over the ABS 241 to crash the magnetic recording medium.

Figure 7G:
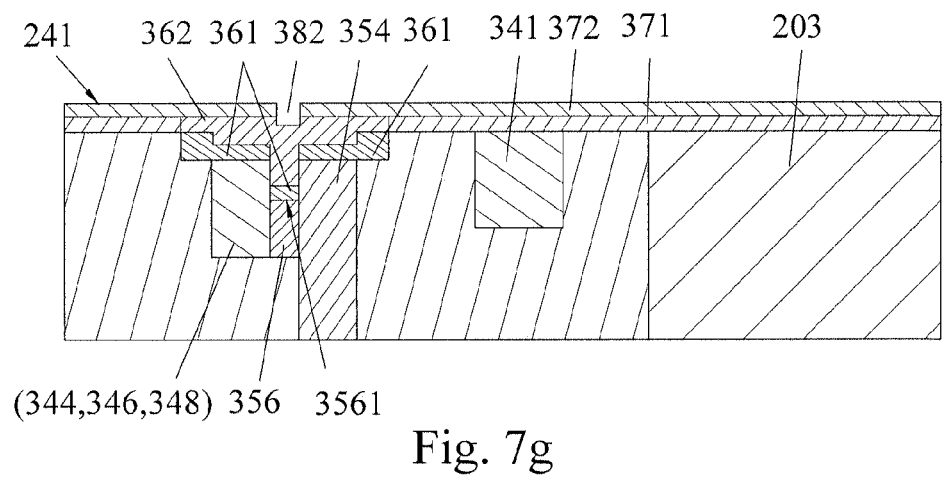
FIG. 7g is a simplified view of the thermally assisted magnetic head slider according to a seventh embodiment of the present invention.

FIG. 7g shows a seventh embodiment of the thermally assisted magnetic head slider 230 according to the present invention. Comparing with the fifth embodiment shown in FIG. 7d, the carbon coat layer 372 formed on the protective layer 362 is also recessed form a top of the ABS 241 with a fourth predetermined distance at a position that is opposed to the near-field light generating surface 3561 of the plasmon unit 356, namely, a fourth recess 382 is formed on the carbon coat layer 362, thereby further enhancing the protection.

The present invention is not limited to embodiments mentioned above, other modified embodiments basing on the specific embodiment mentioned above are also pertained to the concept of the present invention.

In conclusion, in the present invention, since the near-field light generating surface 3561 of the plasmon unit 356 is apart from the ABS 241 with the first predetermined distance to form the first recess, and the first recess is filled in with the protective layer 362, thus the plasmon unit 356 will be prevented from over-expanding and protruding over the ABS 241 during a thermally assisted writing operation. Meanwhile, as the protective layer 362 is deposited on the near-field light generating surface 3561 of the plasmon unit 356, thus the plasmon unit 356 can be protected so as not to crash the recording medium when it expands.

Figure 8:
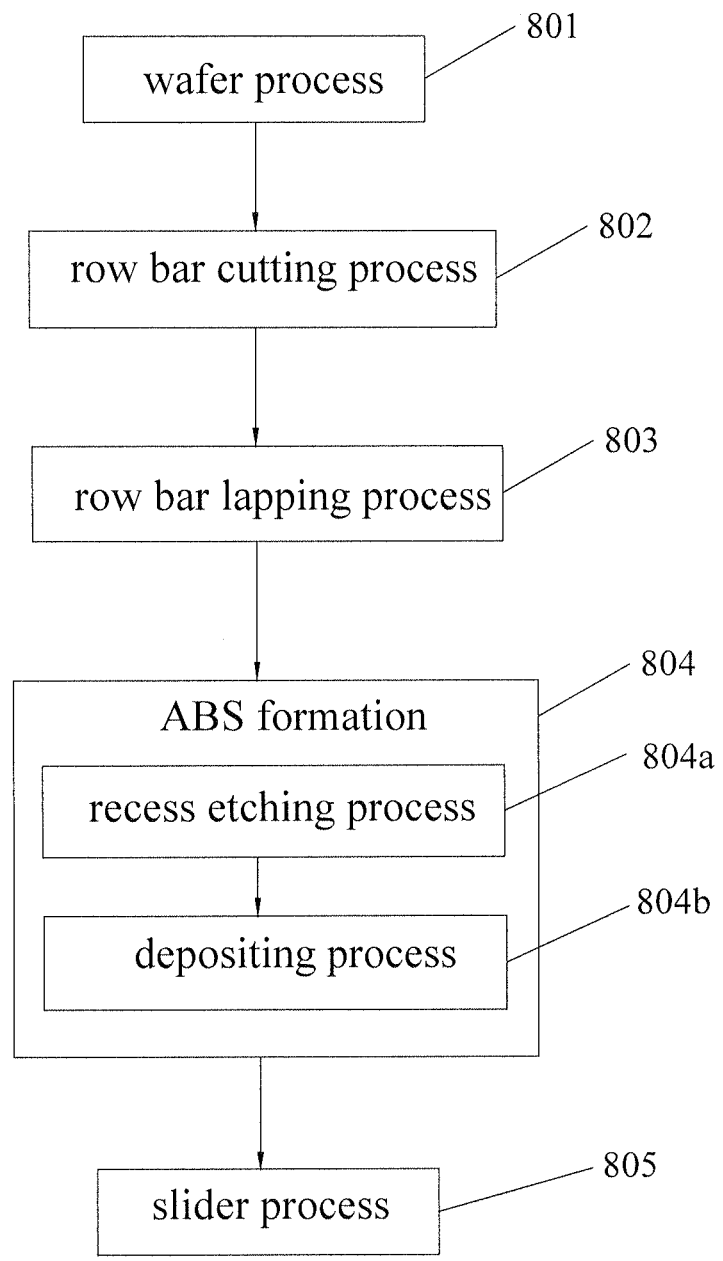
FIG. 8 is a simplified flowchart of a manufacturing method of a thermally assisted magnetic head slider according to one embodiment of the present invention.

FIG. 8 is a simplified flowchart of a manufacturing method of a thermally assisted magnetic head slider according to one embodiment of the present invention.

Step (801), wafer process. Concretely, the process includes providing a wafer with a plurality of thermally assisted magnetic head slider elements each of which has a substrate with an ABS, a read element and a write element including a first magnetic pole, a second magnetic pole, coils, a waveguide, and a plasmon unit.

Step (802), row bar cutting process. In this process, the wafer is cut into a plurality of row bars with a row of thermally assisted magnetic head slider elements arranged.

Step (803), row bar lapping process. Concretely, surfaces of each row bar will be lapped in this process so as to obtain a predetermined requirement.

Step (804), ABS formation. Concretely, the process includes two main steps: (804a) recess etching process, etching a first recess on a near-field light generating surface of the plasmon unit, thereby the plasmon unit is apart from the ABS with a first predetermined distance; (804b) depositing process, depositing a protective layer on the near-field light generating surface of the plasmon unit.

Concretely, in the step (804a), it further includes etching a second recess on opposed-to-medium surfaces of the first, second magnetic poles and the waveguide, thereby the first, second magnetic poles and the waveguide are apart from the ABS with a second predetermined distance.

As a preferred embodiment, the step (804b) further includes depositing a seed layer on the near-field light generating surface of the plasmon unit, and then depositing the protective layer on the seed layer. Concretely, the protective layer is made by low light absorption material, for example the protective layer is made by TaOx, SiOx, AlOx, WOx, BCxNy, AlNx, SiNx, AlOxNy, SiOxNy, TiOx, ZrOx, MgOx, so that less heat energy will be absorbed. And the seed layer beneath the protective layer is made by Si, Al, Mg, Ta, W, Ti, MgOx, SiNx, AlNx, AlOx, SiNxOy, AlNxOy, WOx, DLC, which is not easy to be bended so as to enhance the protective layer and reduce the thermal deformation of the protective layer.

Step (805), slider process. The row bar will be cut into a plurality of individual thermally assisted magnetic head slider; thereby the whole process is accomplished.

Figure 9:
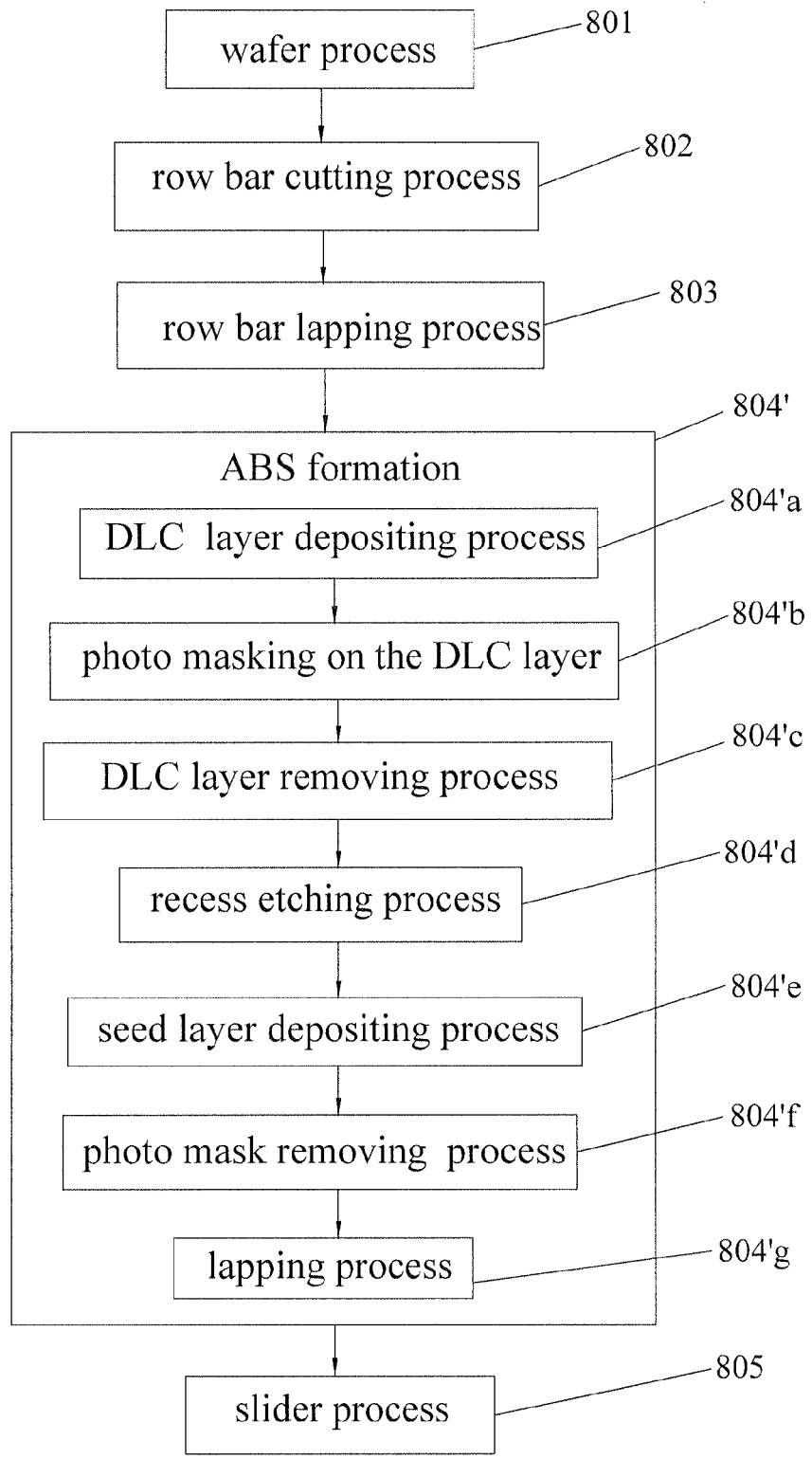
FIG. 9 is a manufacturing method of a thermally assisted magnetic head slider according to another embodiment of the present invention.

FIG. 9 shows a manufacturing method of a thermally assisted magnetic head slider according to another preferable embodiment of the present invention. Different from the first embodiment, the ABS formation (step 804') in the present embodiment includes sub-steps:

(804'a), depositing a carbon coat layer, such as a DLC layer on the opposed-to-medium surface of the read element and the write element;

(804'b), putting a photo mask on the DLC layer with the portion of the DLC layer opposing to the first, second magnetic pole, plasmon unit and waveguide are exposed;

(804'c), removing the portion of the DLC opposing to the first, second magnetic poles, coils, plasmon unit and waveguide are exposed;

(804'd), etching a recess on a near-field light generating surface of the plasmon unit and top surfaces of the first magnetic pole and the second magnetic pole, thereby the plasmon unit is apart from the ABS with a first predetermined distance, and the first magnetic pole and the second magnetic pole are apart from the ABS with a second predetermined distance. Concretely, the etching way can be ion beam etching method or use photo mask to etch. Preferably, the second predetermined distance is smaller than the first predetermined distance, and the first predetermined distance is in a range of 1 nm~300 nm. Alternatively, the first predetermined distance can be smaller than the second predetermined distance.

(804'e), depositing a seed layer on the opposed-to-medium surfaces of the read element and the write element, and depositing a protective layer on the seed layer;

(804'f), removing the photo mask;

(804'g), lapping the opposed-to-medium surfaces of read element and write element so as to form a flat surface.

Preferably, the method may further include etching a third recess with a third predetermined distance on the protective layer at a position that is opposed to the near-field light generating surface.

Selectively, it may further include step of coating a carbon coat layer to cover the flat surface for protecting the whole thermally assisted magnetic head slider.

Alternatively, the method can include removing a portion of the carbon coat layer at a position that is opposed to the near-field light generating surface by heating the portion of the carbon coat layer.

More preferably, the manufacturing method may further include etching a fourth recess with a fourth predetermined distance on the carbon coat layer at a position that is opposed to the near-field light generating surface.

In conclusion, compared with the prior art, the present invention aims at providing an improved manufacturing method of a thermally assisted magnetic head slider by etching a first recess on the near-field light generating surface of the plasmon unit, thereby the plasmon unit apart from the ABS with a predetermined distance, thereby preventing the plasmon unit from over-expanding and protruding over the ABS during a thermally assisted writing operation. Meanwhile, as the protective layer is deposited on the near-field light generating surface of the plasmon unit, thus the plasmon unit can be protected so as not to crash the recording medium when it expands.

While the invention has been described in connection with what are presently considered to be the most practical and preferred embodiments, it is to be understood that the invention is not to be limited to the disclosed embodiments, but on the contrary, is intended to cover various modifications and equivalent arrangements included within the spirit and scope of the invention.

What is claimed is:

1. A write element for a thermally assisted magnetic head slider, comprising:
    an air bearing surface facing to a magnetic recording medium;
    a first magnetic pole, a second magnetic pole, and coils sandwiched between the first magnetic pole and the second magnetic pole;
    a waveguide for guiding light generated by a light source module mounted on a substrate of the thermally assisted magnetic head slider; and
    a plasmon unit provided around the first magnetic pole and the waveguide, which has a near-field light generating surface for propagating near-field light to the air bearing surface;
    wherein the near-field light generating surface of the plasmon unit is apart from the air bearing surface with a first predetermined distance to form a first recess, and the first recess is filled in with a protective layer including low light absorption material that is different from that of the magnetic poles.

2. The write element according to claim 1, wherein opposed-to-magnetic recording medium surfaces of the first, second magnetic poles and the waveguide are apart from the air bearing surface with a second predetermined distance to form a second recess, and the second recess is filled in with the protective layer.

3. The write element according to claim 2, wherein the second predetermined distance is smaller than the first predetermined distance.

4. The write element according to claim 2, wherein the first predetermined distance is smaller than the second predetermined distance.

5. The write element according to claim 1, wherein the first predetermined distance is in a range of 1 nm~300 nm.

6. The write element according to claim 1, wherein the opposed-to-medium surfaces of the first, second magnetic poles and the waveguide are covered by the protective layer.

7. The write element according to claim 1, further comprising a seed layer formed on the near-field light generating surface and the opposed-to-medium surfaces of the first and second magnetic poles, and wherein the protective layer is formed on the seed layer.

8. The write element according to claim 1, wherein the low light absorption material is one or more selected from TaOx, SiOx, AlOx, WOx, BCxNy, AlNx, SiNx, AlOxNy, SiOxNy, TiOx, ZrOx, and MgOx.

9. The write element according to claim 7, wherein the seed layer is made by one or more selected from Si, Al, Mg, Ta, W, Ti, MgOx, SiNx, AlNx, AlOx, SiNxOy, AlNxOy, WOx, and diamond-like carbon.

10. The write element according to claim 1, wherein the protective layer is recessed from a top of the air bearing surface with a third predetermined distance at a position that is opposed to the near-field light generating surface.

11. The write element according to claim 1, wherein a surface of the protective layer is flat.

12. The write element according to claim 1, wherein a carbon coat layer is covered on the protective layer.

13. The write element according to claim 12, wherein the carbon coat layer is recessed from a top of the air bearing surface with a fourth predetermined distance at a position that is opposed to the near-field light generating surface.

14. The write element according to claim 1, wherein the plasmon unit is a plasmon antenna or a plasmon generator.

15. A thermally assisted magnetic head slider, comprising a substrate having an air bearing surface facing to a magnetic recording medium, a read element, and a write element, the write element comprising:
    a first magnetic pole, a second magnetic pole, and coils sandwiched between the first magnetic pole and the second magnetic pole;
    a waveguide for guiding light generated by a light source module mounted on the substrate; and
    a plasmon unit provided around the first magnetic pole and the waveguide, which has a near-field light generating surface for propagating near-field light to the air bearing surface;
    wherein the near-field light generating surface of the plasmon unit is apart from the air bearing surface with a first predetermined distance to form a first recess, and the first recess is filled in with a protective layer including low light absorption material that is different from that of the magnetic poles.

16. A head gimbal assembly, comprising a thermally assisted magnetic head slider having a substrate with an air bearing surface facing to a magnetic recording medium, a read element and a write element, and a suspension supporting the thermally assisted magnetic head slider, the write element comprising:
    a first magnetic pole, a second magnetic pole, and coils sandwiched between the first magnetic pole and the second magnetic pole;
    a waveguide for guiding light generated by a light source module mounted on the substrate; and
    a plasmon unit provided around the first magnetic pole and the waveguide, which has a near-field light generating surface for propagating near-field light to the air bearing surface;
    wherein the near-field light generating surface formed by the plasmon unit is apart from the air bearing surface with a first predetermined distance to form a first recess, and the first recess is filled in with a protective layer including low light absorption material that is different from that of the magnetic poles.

17. A hard disk drive, comprising a head gimbal assembly with a thermally assisted magnetic head slider, a drive arm to connect with the head gimbal assembly, a rotatable disk, and a spindle motor to spin the disk; the thermally assisted magnetic head slider comprising a substrate having an air bearing surface facing to a magnetic recording medium, a read element and a write element, the write element comprising:
    a first magnetic pole, a second magnetic pole, and coils sandwiched between the first magnetic pole and the second magnetic pole;
    a waveguide for guiding light generated by a light source module mounted on the substrate; and a plasmon unit provided around the first magnetic pole and the waveguide, which has a near-field light generating surface for propagating near-field light to the air bearing surface;

wherein the near-field light generating surface of the plasmon unit is apart from the air bearing surface with a first predetermined distance to form a first recess, and the recess is filled in with a protective layer including low light absorption material that is different from that of the magnetic poles.

* * * * *